United States Patent [19]

Browne

[11] Patent Number: 5,914,163
[45] Date of Patent: Jun. 22, 1999

[54] REDUCED CRUSH INITIATION FORCE COMPOSITE TUBE

[75] Inventor: Alan Lampe Browne, Grosse Pointe, Mich.

[73] Assignee: General Motors Corporation, Detroit, Mich.

[21] Appl. No.: 08/948,963

[22] Filed: Oct. 10, 1997

[51] Int. Cl.⁶ .............................. B29D 22/00; B22B 3/10; B60R 19/26; B60R 19/34
[52] U.S. Cl. .................... 428/36.1; 428/36.91; 428/134; 428/136; 296/189; 293/132; 293/133; 138/119
[58] Field of Search ................................ 428/36.1, 36.91, 428/36.92, 134, 136; 296/189; 293/132, 133; 138/119

[56] References Cited

U.S. PATENT DOCUMENTS

| 4,742,899 | 5/1988 | Thornton | 188/377 |
| 5,192,384 | 3/1993 | Barrier et al. | 156/189 |
| 5,281,454 | 1/1994 | Hanson | 428/36.3 |
| 5,324,248 | 6/1994 | Quigley | 492/50 |
| 5,324,558 | 6/1994 | Muto et al. | 428/36.91 |
| 5,732,801 | 3/1998 | Gertz | 188/377 |

*Primary Examiner*—Ellis Robinson
*Assistant Examiner*—Jennifer M. Hayes
*Attorney, Agent, or Firm*—George A. Grove

[57] ABSTRACT

A multi-fabric layer, resin matrix laminated composite tube is disclosed having an end portion adapted for crush initiation by the provision of slits in the fabric of at least the innermost fabric layers of said tube, the lengths of said slits preferably decreasing in progressively outer fabric layers of the laminated material.

8 Claims, 3 Drawing Sheets

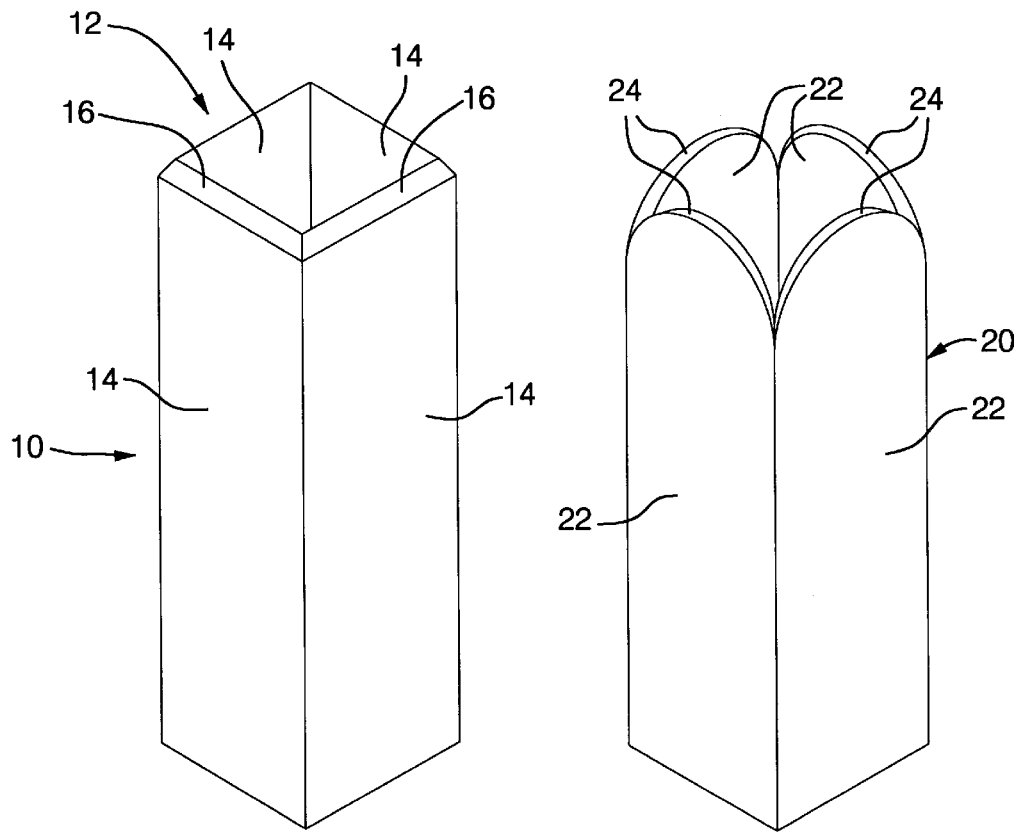
PRIOR ART
FIG. 2A
PRIOR ART
FIG. 2B
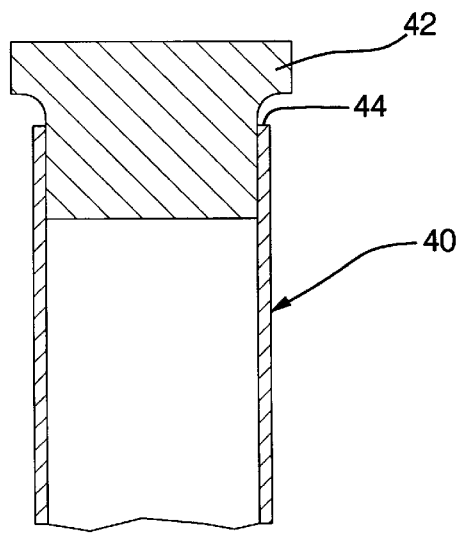
PRIOR ART
FIG. 2C

REDUCED CRUSH INITIATION FORCE COMPOSITE TUBE

TECHNICAL FIELD

This invention pertains to improvements in multi-layer fiber-reinforced polymer matrix composite tubes that are intended to serve as structural members and/or crash energy absorbers in automobiles and other applications. More specifically, this invention pertains to improvements of such composite tubes that enable them to reduce the magnitude of end-wise crush initiation forces and undergo stable axial crush in a crash situation.

BACKGROUND OF THE INVENTION

In the ongoing effort to reduce the weight and increase the crash energy absorbing characteristics of structural members in automobile bodies and the like, attention is being given to the use of hollow tubular laminated composite bodies. Typically, such bodies are cylindrical tubes that are round, square or rectangular in cross section and are made up of several plies or layers of woven or nonwoven reinforcing fabric that is embedded in or infiltrated with a solid matrix of a thermoset or thermoplastic resin material. The reinforcing fabric is suitably made of oriented or randomly arranged fibers of materials such as carbon, aramid filaments available commercially, for example, under the trade name Kevlar, glass fibers and mixtures or hybrids of such fibers. Examples of suitable matrix materials are epoxy and polyester resins.

In automotive applications, though sometimes the tube is straight over its entire length, in general, it has a straight section that is intended to resist an impact acting on the end of the tube along its longitudinal axis. For example, the tube may be aligned as a rail in the fore/aft direction of the automobile and intended to absorb impacts that are imposed on the bumper system of the vehicle.

The tube is intended to absorb the energy of a crash by undergoing a progressive crush, beginning at the lead end of the tube. Observed desirable failure modes include progressive longitudinal tearing, peeling or splitting, and accordion-like buckling of the structural member in the direction of crash. This is the intended dominant failure mode of the laminated composite tube. The challenge with respect to these strong laminated structural bodies is to provide a crush initiator that leads to a stable progressive crush of the member beginning at the lead end and progressing stably along its length so that the tube does not fail prematurely and catastrophically at a point further down its length, either locally due to high compressive forces or globally due to column buckling.

Previous attempts to provide axial crush initiation at the lead end of these composite tube structures have included use of a plug initiator or trigger that is inserted into the end of the tube. The plug, typically a specially-designed metal member, progressively cuts or slices its way down the tube as a crush force is applied. Other approaches of initiating crush at the lead end have been to bevel the edges of the four sides at the end of the tube or to cut back each of the four sides at the end of the tube into rounded, tulip-like configurations (see FIG. 2B described below). The bevels in many cases have failed to suitably reduce the crush initiation loads, which has either led to instantaneous, catastrophic failure of the tube structure or the transmission of excessive forces to the occupant compartment rather than initiating a desired progressive crush. The tulipped end has experienced several similar deficiencies and in addition has impeded the attachment of another structural member such as a bumper.

The use of a plug-like initiator adds considerable mass to the structure and also may dramatically reduce the force level during a stable progressive crush so that the member does not absorb the amount of energy that it was designed to absorb.

Accordingly, there remains a need to better enable a laminated composite tubular crash energy absorber member to better reduce the magnitude of crush initiation forces and to absorb crash energy in a progressive manner.

SUMMARY OF THE INVENTION

This invention provides a method and design for significantly reducing the crush initiation forces in fiber-reinforced resin matrix composite tube structures that are intended to absorb energy in a crash. The application and method will be described in terms of a rectangular or square cross section laminated composite tube. However, it is to be understood that the same principles are applicable to round tubes or to tubes of other cylindrical cross sections.

Previous testing by the inventor has shown that axial failure by tearing along the four corners of rectangular composite tubes is a natural and stable dynamic crush mode for such tubes when they are fabricated from multiple layers of CSM (continuous strand mat), RCM (random chopped mat) or woven fabric, unidirectional oriented fibers, and tri-axially braided composite fabrics. Briefly stated, the invention involves cutting longitudinal slits into individual layers of the fabric reinforcement during the performing stages at each of the four corners of the lead end of the tube where crush initiation is desired. Additionally, the length of these slits is to be varied linearly between consecutive plies or fabric layers of the tube. Thus, by changing the length of the corner slits between successive plies, the idea is to initiate fabric splitting/failure in one ply at a time rather than in all plies simultaneously. Such a linear variation in slit length between the plies lowers the peak force generated during the development of the stable crush mode by spatially spreading out the contributions of the individual plies. As a result, the peak force experienced at any moment during the initial period when crush is being initiated in the individual plies is reduced while the mean crush force generated by the tube once stable progressive crush is reached is unreduced.

Accordingly, this invention provides a design for multi-layer composite tubes which minimizes any loss in strength and stiffness in their role as structural members and yet permits them to generate substantial crash loads on end and along the axis of the tube in a stable manner without catastrophic failure. Indeed, the failure occurs progressively so that the tube absorbs maximum energy as it is being crushed, which minimizes other damage to the vehicle.

The crush initiator slits of this invention may be suitably spaced at the end of a composite tube of any cylindrical cross-section. The slits may be introduced into any suitable fabric reinforcement and used with any suitable polymer resin matrix material.

These and other objects and advantages of the invention will become more apparent from a detailed description thereof as follows. Reference will be had to the drawings.

BRIEF DESCRIPTION OF THE DRAWINGS

FIGS. 2A–2C illustrate three prior art crush initiators used in composite tubes. FIG. 2A illustrates the beveled lead end, FIG. 2B illustrates the tulip trigger lead end, and FIG. 2C illustrates the plug-type crush initiator or trigger.

DESCRIPTION OF PREFERRED EMBODIMENTS

The invention provided herein is designed to produce a desirable force deflection relationship that reduces the peak force required to initiate the crushing of a composite tube but through controlled crushing accommodates a high level of energy absorption. The important advantage of this invention is that the composite tubular beam, although undergoing crushing, supports relatively high uniform force levels but precludes buckling of the composite structural member as well as failure of the backup structure.

Figure 1A:
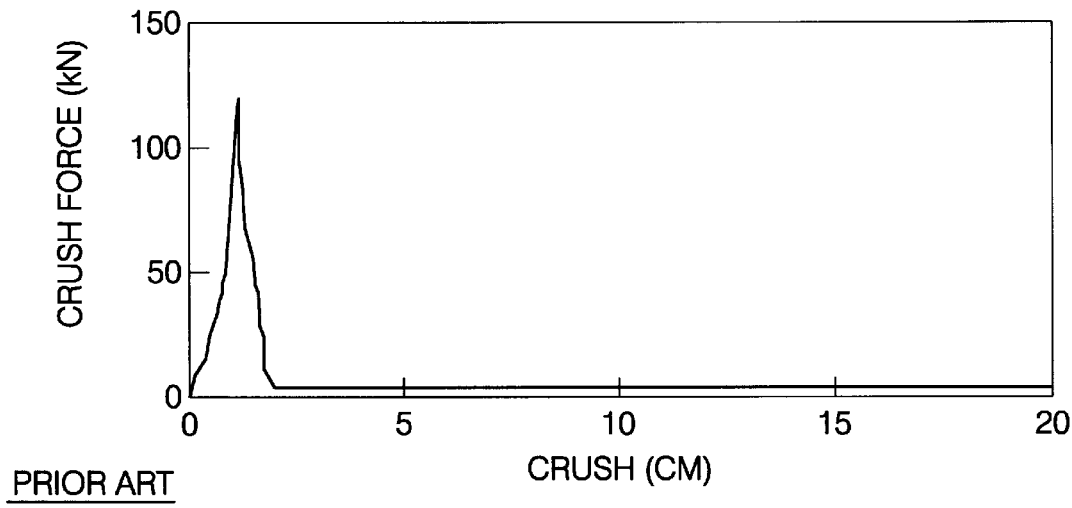
FIG. 1A is a graph of crush force in kiloNewtons versus crush distance in centimeters (cm) in a rectangular tube undergoing undesirable premature buckle.
Figure 1B:
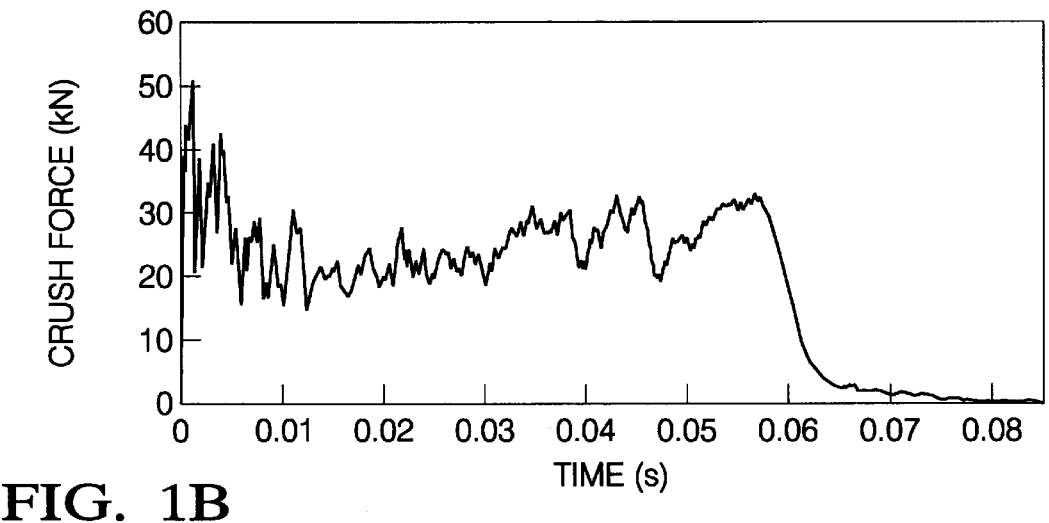
FIG. 1B is a graph of crush force (kN) versus time in seconds (s) in the situation of the desired crush mode of a square composite tube utilizing this invention.
Figure 1C:
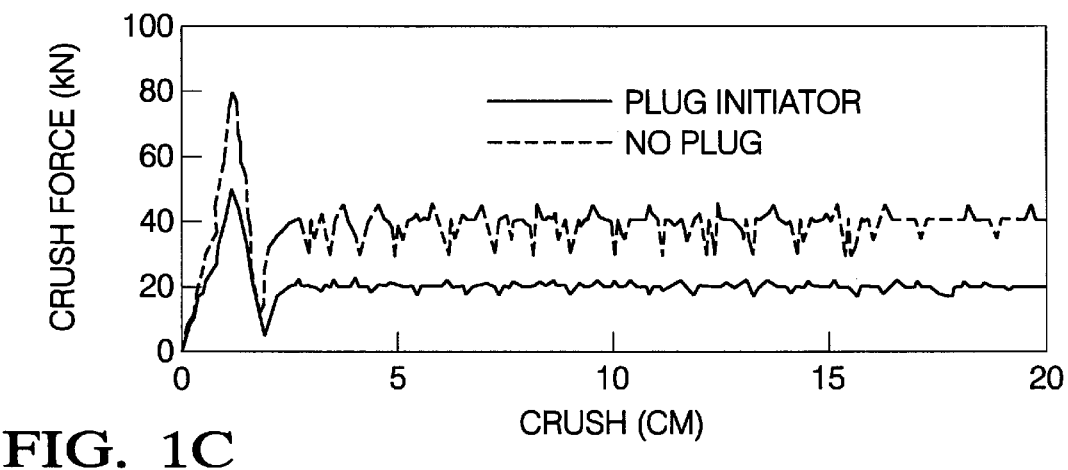
FIG. 1C is a graph of crush force (kN) versus crush distance (cm) for a composite tube not utilizing this invention with and without a supplemental plug initiator.

FIGS. 1A–1C illustrate the need for and advantages provided by the crush initiator of this invention. FIG. 1A is a crush force trace obtained from applying a force to the end of a laminated, square, composite tube having no crush initiator means. It is seen in the FIG. 1A graph that at the start of impact, forces rapidly build up in the tube, reaching a level of about 120 kN. The tube buckles under this high load and thereafter absorbs no force or energy. The tube fails catastrophically either locally due to high compressive force or globally due to column buckling. The area under the force-displacement curve of FIG. 1A represents the energy that is absorbed, which is minimal in the case of such a collapse.

The invention provided in this specification produces the more desirable force-deflection trace shown in FIG. 1B with its associated higher level of energy absorption. Important features of this trace are the higher relatively uniform force levels (about 20 to 30 kN) through the majority of the trace and an initial peak (about 50 kN) that is sufficiently low so as to preclude both buckling of the composite structural member as well as failure of the backup structure. Crush initiators such as the slits utilized in this invention operate to produce such a desirable trace by producing a localized failure at one end of the tube. The failure then progresses along the length of the structure.

FIG. 1C illustrates that the use of a plug initiator reduces initial yield forces and produces stable crush. However, the applied force at which crush occurs is also reduced as is the amount of energy that is absorbed by the failing tube.

FIG. 2 illustrates prior art examples of commonly used crush-triggering designs. FIG. 2A illustrates a composite square tube 10 with a beveled lead end 12. The edges 16 of each of the four sides 14 are tapered from the outside. FIG. 2B illustrates a composite square tube 20 where each of the four faces 22 of the composite have rounded-off ends 24 that look like the leaves of a tulip. Finally, FIG. 2C illustrates a composite tube 40 in cross section with a plug initiator 42 inserted at end 44. The plug initiator is usually made of metal and cuts or forces its way down the tube under a crash force.

A problem with the beveled or tulipped ends is that they do not consistently avoid high dynamic crush initiation loads for all combinations of wall thickness and fiber architecture, which high loads can lead either to failure of the backup structure or to tube buckling, rather than a desired progressive crush. A second problem is that it is difficult to attach another structural member such as a bumper to the tulipped end. Problems with the plug-type initiator depicted in FIG. 2C are that the initiator adds considerable mass to the structure and also significantly reduces the force level/energy absorption during a progressive crush.

The present invention is designed to be an improvement over alternative existing approaches for crush initiation in the case of hollow tubular laminated composite structures. Testing of tubes of this type have shown that for a wide range of fiber types and fiber architectures, a stable progressive crush is characterized by longitudinal tearing or splitting of the structural member along its axis in the direction of the crush. In order to best initiate this particular crush mode—longitudinal tearing/splitting—the present invention was devised.

This invention provides the use of built-in corner slits in the reinforcing fabric layers of rectangular and square cross section tubes to anticipate their natural crush morphology, which, with the exception of Kevlar fabrics and biaxially braids, is tearing at the four corners. Even though built-in corner slits do not anticipate the natural crush morphology of these two exceptions, which involve progressive accordion-type folding/buckling of the tube, this invention still provides a measurable reduction in crush initiation forces with Kevlar fabrics and biaxially braids as well. Likewise, the use of six or seven built-in slits evenly spaced in the fabric around the circumference of a circular tube would anticipate the natural crush morphology of the circular cross section geometry which tests have shown to be splitting into multiple petals or fronds, again with the previously-mentioned exceptions. The use of corner slits a minimum of one inch in length, for example, is consistent with the crush distance of approximately one inch that has been found in experiments with composite tubes to be necessary to establish stable progressive crush in the ply or layer of fabric of composite tubes. In the case of tubes with more than two fabric plies, to be consistent with the one-inch requirement, slit length should increase a minimum of one inch between adjacent fabric plies as one proceeds from the outer surface to the inner surface. The use of staggered length corner slits increasing a minimum of, for example, one inch in length between adjacent fabric plies or groups of plies as one proceeds from the outer to the inner surface of the tube spreads out the force peaks associated with the initiation of crush in the individual plies. This practice reduces the maximum value of force occurring in the crush initiation phase that precedes a stable progressive crush. In addition, by increasing the length of built-in slits in the fabric plies as one proceeds from the outer to the inner surface, one ensures that cracks in the outer of any two adjacent plies will always have propagated further along the length of the tube than those of the inner of the two plies. This ensures that crack propagation in an inner ply will never be arrested by the presence of an intact outboard ply.

To illustrate the invention, several three and one-half inch by three and one-half inch square cross section composite tubes approximately 20 inches long with 0.1 inch thick walls and a one-half inch outside radius at the four corners were made and tested. These tubes were constructed in the following manner. A thin layer of glass veil material was first wrapped around a square steel mandrel as a processing aid.

The mandrel was removed after molding and served simply as a manufacturing aid in producing the desired hollow cross section geometry of a tube. Next, eight plies of Hexce 282 3K tow, plain weave, carbon fiber fabric were wrapped around the mandrel with fabric seams positioned along the length of the tube in the center of the flat faces of the cross section. These seams in the individual plies were scattered among the four faces so that the seams were not in alignment. Corner slits were cut into the fabric of six of the individual plies as they were applied, these slits being located in the intended lead end of the tube. Corner slits were cut in the following manner. Three inch corner slits were cut in the first two plies wrapped on the mandrel (collectively the innermost layer in FIGS. 3A–3C).

Figure 3A:
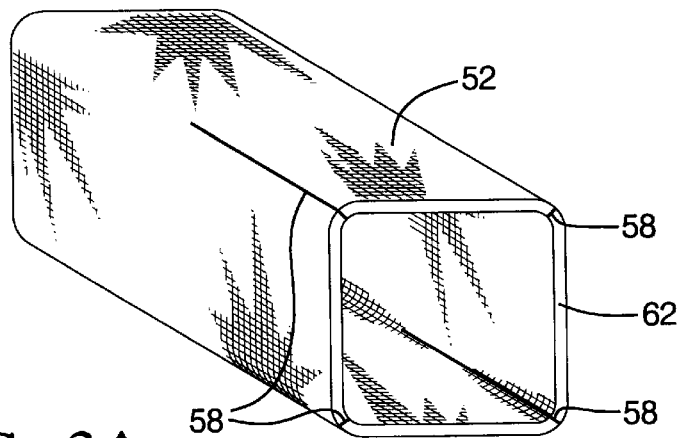
FIG. 3A illustrates the formation of a four-layer laminate rectangular composite tube showing the inner ply of fabric with built-in corner slits.

FIGS. 3A, B and C are a series of views showing the build up of the four fabric layers of a square laminated tube 50 (ultimately a composite tube) four-sided inner fabric layer 52, a second fabric 54, a third layer 56 and an outer layer 72. The finished composite tube will, of course, have a resin matrix that infiltrates all of the fabric layers. The resin is not shown in the inner three fabric layers of FIGS. 3A–3C so that the relationship of the slits in the fabric layers can be shown. Once the appropriate slits have been introduced into the reinforcing fabric layers in accordance with this invention, the infiltration of the fabric layers with a resin follows known practices.

The longest slits (three inches) are located at each of the four corners of the innermost layer. These slits are indicated at 58 and extend axially along fabric layer 52 (comprising two plies) from end 62. While the fabric layer in FIG. 3A will ultimately be impregnated with a resin to constitute a layer of a composite tube, the slits are actually formed in the woven carbon fiber fabric plies before it was infiltrated with resin.

Figure 3B:
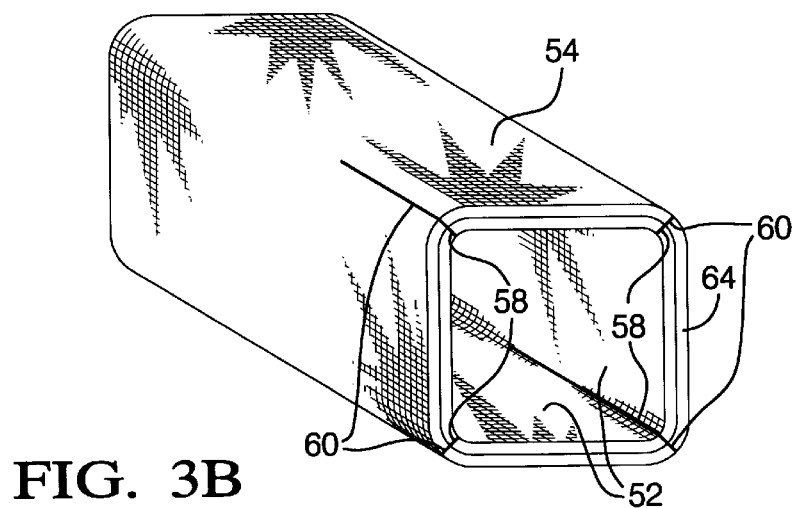
FIG. 3B shows the slits in the second layer of fabric.

Two-inch corner slits were cut into the next two plies of the fabric. FIG. 3B shows the shorter preformed slits in each of the four corners of the second fabric layer 54 of tube 50. The slits are indicated at 60 at the four corners of the second layer 54 of that figure. Slits 60 extend axially from end 64 of layer 54. One long slit 58 in the inner fabric layer 52 remains visible in FIG. 3B.

Figure 3C:
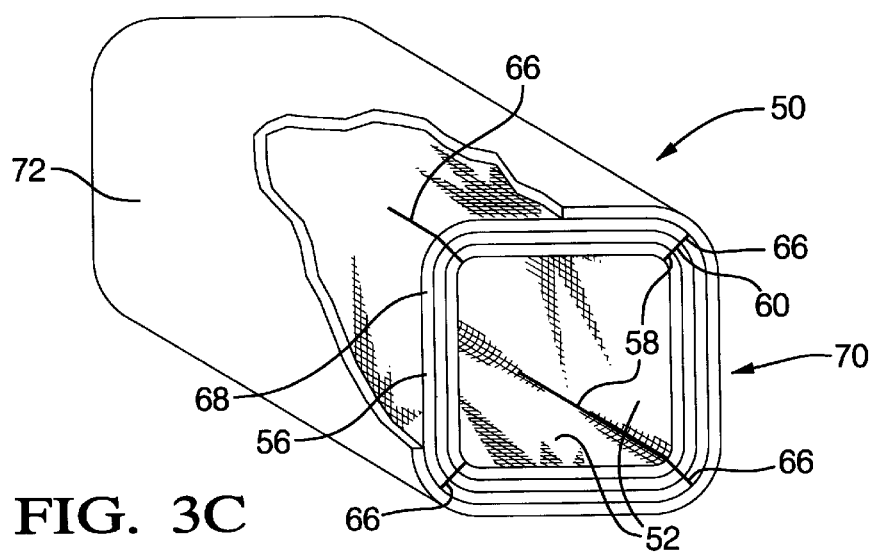
FIG. 3C shows the finished four-layer fabric perform with its intact outer ply.

One-inch corner slits were cut in the fifth and sixth fabric plies, and the two plies comprise the third layer 56 (referring to FIG. 3C). Thus, third tube fabric layer 56 has four relatively short slits 66 extending axially along each of the four corners of layer 56 from its end 68. Finally, the seventh and eighth fabric plies were applied as unfitted outer fabric layer 72. Outer layer 72 is shown only in part in FIG. 3C because it had no slits but would have covered the depiction of corner slit 66 in third layer 56.

Thus, square tube 50 includes four fabric layers 52, 54, 56 and 72. The three inner layers have corner slits extending from their respective ends 62, 64 and 68 axially along the tubular layer. The respective slits 58, 60 and 66 get progressively shorter from first inner layer 52 to second layer 54 to third layer 56. Outer layer 72 has no slits (and is illustrated as though infiltrated with resin). End 70 is the intended lead end of tube 50 for receiving a crash impact.

This particular scheme of corner slitting, which is a natural variant of this invention, was chosen so that stable, progressive crush would be achieved after four inches of crush rather than seven inches if corner slit length was altered in every ply. This example sacrifices some of the eventual reduction in initial peak force that might be achievable in exchange for a shorter crush initiation length.

Finally, a thin layer of continuous strand mat of glass fibers was added to the outer surface of the carbon fibers as a processing aid assisting uniform resin flow through and wet out of the carbon fabric. The mandrel with fabric wrap was then placed in a heated mold (90° C.). The mold was closed and a vinyl ester thermosetting resin injected. Cure occurred over approximately a five-minute period, after which the mold was opened and the part removed. After cool down, the metal mandrel was removed. Subsequently, the composite tube was post-cured for several hours at elevated temperature. As stated, FIGS. 3A–3C show the important features of the slitted fabric layers before resin infiltration. Once the resin matrix has been formed, the slits in the fabric layers are not readily visible.

Several square tubes were made by the above practice. The tubes were identical except that not all of the tubes were provided with slits. For the purpose of obtaining comparative crush force data, several laminated tubes were made without corner slits in any layer. One such tube was provided with 45° bevels on the lead edges of each side surface. Another unslitted tube was beveled and then one-half inch long slits were sawed in each corner uniformly through each layer after molding. One unslitted tube was beveled and then provided with an inserted plug initiator (FIG. 2C). A tube of this invention containing staggered length corner slits in the fabric perform layers was provided with 45° bevels for testing.

Each of the tubes were subjected to end-applied identical impact speeds in the following manner. The trailing end of each tube was glued with hot melt into a recessed channel in a flat metal plate which in turn was affixed with bolts to the underside of a weighted platform (~320 lbs.), the lead end of the composite tube pointing down. This "drop" platform was then raised to a nominal height of approximately 200 inches. The platform was then released, falling under the action of gravity, providing a velocity at impact of 22 mph. Motion of the platform was arrested by forces generated by crush of the composite tube. These forces were measured by load cells positioned under a flat horizontal metal "impact" plate at the base of the drop tower against which the composite tube crushed.

Test data are recorded in the following table.

| Lead Edge Treatment | Peak Force* | Mean Crush Force* |
|---|---|---|
| 45° Bevel | 1.00 | 1.00 |
| 45° Bevel, ½" Corner Slits | 0.83 | 1.05 |
| Sawed in after Molding | 0.66 | 1.03 |
| 45° Bevel, Staggered Length Corner Slits in Fabric Preform | 0.46 | 0.53 |
| 45° Bevel, Plug Initiator | | |

*Normalized with respect to date for the case of a 45° bevel lead edge treatment As indicated, these data have been normalized with respect to the test results for the baseline case of a lead edge treatment consisting of just a 45 degree bevel (see FIG. 2A). The effectiveness of the proposed invention for reducing the initial peak force without affecting the mean crush force is clearly indicated. In contrast, the use of a plug initiator (see FIG. 2C) while producing the greatest reduction in initial peak force (see plot of FIG. 1C) is seen to have also dramatically reduced the mean crush force, which may or may not be desirable depending on the specifics of a particular application.

Thus, through the use of this invention and its provision of staggered length corner slits built into a fabric perform, a dramatic reduction in the force level needed to initiate crush is obtained. This result is obtained without lowering energy dissipation levels, without any mass penalty in the structure and with only minimal reduction in the strength and stiffness of the structure. Furthermore, there is little hindrance to lead end attachments which may be required to attach the tubular structure to other portions of a body.

Laminated, fabric-reinforced, resin matrix composites have been formed of many oriented and unoriented fabric constructions and by using many different woven and nonwoven fabric materials and many different thermoplastic and thermosetting polymer compositions. Obviously, one skilled in the art may select from many fabric and polymer possibilities to select combinations suitable for a specific laminated tube application. The practice of this invention is not limited by a specific fabric or resin (or group of fabrics or resins). The invention resides in the selective slitting of the intended impact-receiving end of the tube.

In a tube with a plurality of straight or curved sides and corners, it is preferred that the slits be introduced at the corners. In a round tube, the slits are preferably spaced uniformly about the circumference. In a particular layer or ply of the tube, the slits may be formed in the fabric before the resin is introduced—or in a composite sheet. The lengths of the slits in the respective layers can be the same (though their effectiveness is reduced as the number of layers is increased), or they can be of different lengths in successive layers as is preferred.

Accordingly, while this invention has been described in terms of a few specific embodiments, it will be appreciated that other forms could be adapted by one skilled in the art. Thus, the scope of the invention is to be considered limited only by the following claims.

I claim:

1. A composite tube comprising a plurality of layers of reinforcing fabric, each layer being embedded in a polymeric resin matrix, said tube having a cylindrical cross section comprising successively innermost to outermost layers of said fabric, a longitudinal axis and an end being adapted to receive a crushing force directed along said axis, said tube comprising at least two fabric layers that each have a plurality of slits in said fabric spaced around the cross section and extending from said end in the respective layer parallel to said axis.

2. A composite tube as claimed in claim 1 in which two layers containing slits are adjacent to each other.

3. A composite tube as claimed in claim 2 in which each slit in one layer is adjacent a slit in the adjacent layer.

4. A composite tube as claimed in claim 2 or 3 in which the slits in a layer are all the same length.

5. A composite tube as claimed in claim 4 in which the slits in one of said layers are longer than the slits in a more outward layer.

6. A composite tube as recited in claim 1 comprising at least three said layers and in which no slits are formed in the outermost layer.

7. A composite tube comprising a plurality of layers of reinforcing fabric progressing from an innermost layer to an outermost layer embedded in a polymeric matrix, said tube having a rectangular cross section and at least a straight portion with a longitudinal axis with an end of the straight portion being adapted to receive a crushing force directed along the axis of said tube end, the corners of at least the innermost fabric layer containing slits of a first predetermined length extending from the end of said tube layer in the axial direction and the corners of at least one additional outerlying fabric layer of said tube containing slits at its four corners extending to a predetermined but shorter distance along the length of said tube.

8. A composite tube as recited in claim 7 comprising at least four fabric layers with slits in the three innermost layers and no slits in the outermost layer.

* * * * *